O. M. HOCH.
SHEAR MECHANISM.
APPLICATION FILED DEC. 20, 1915.
1,321,039.
Patented Nov. 4, 1919.
4 SHEETS—SHEET 1.
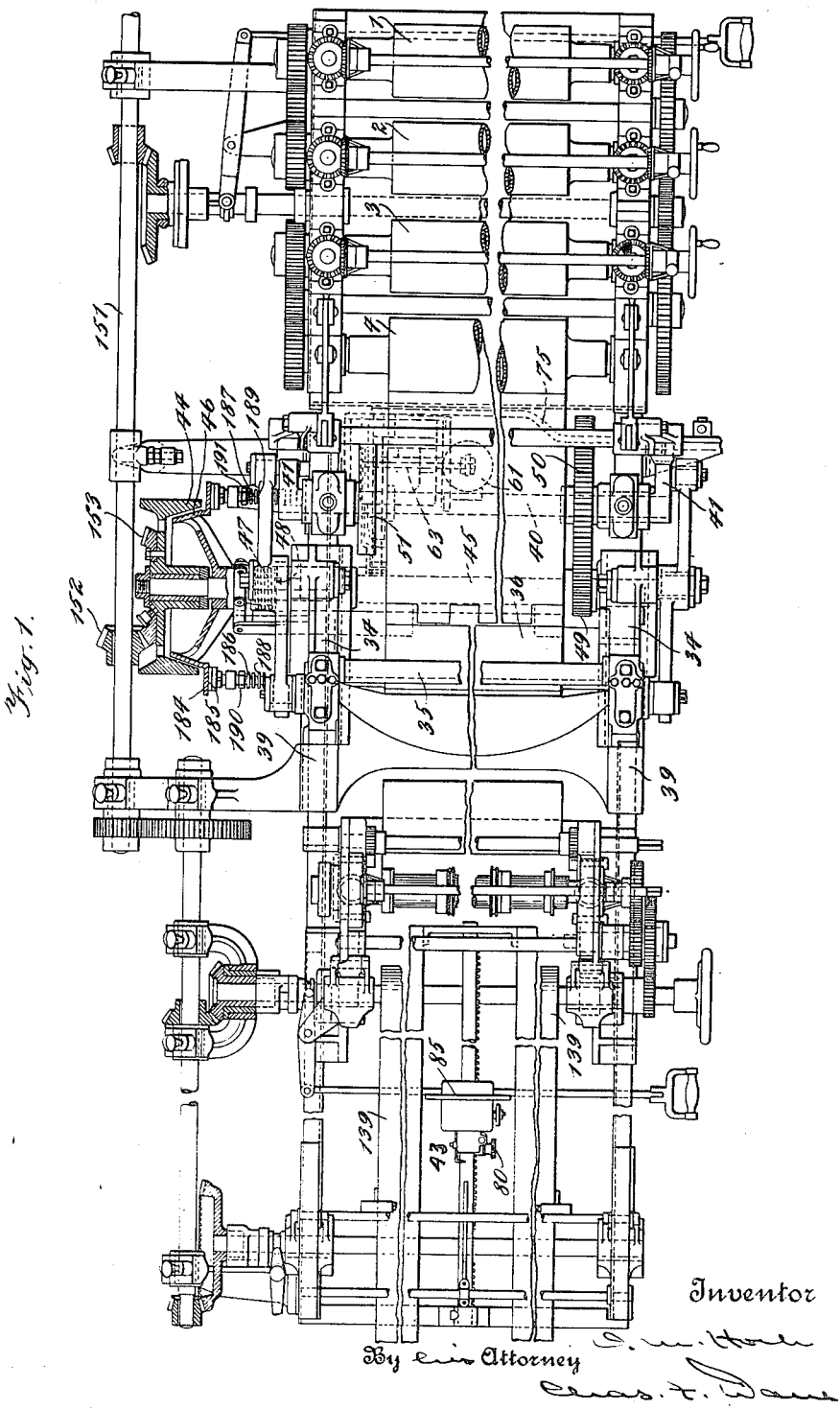

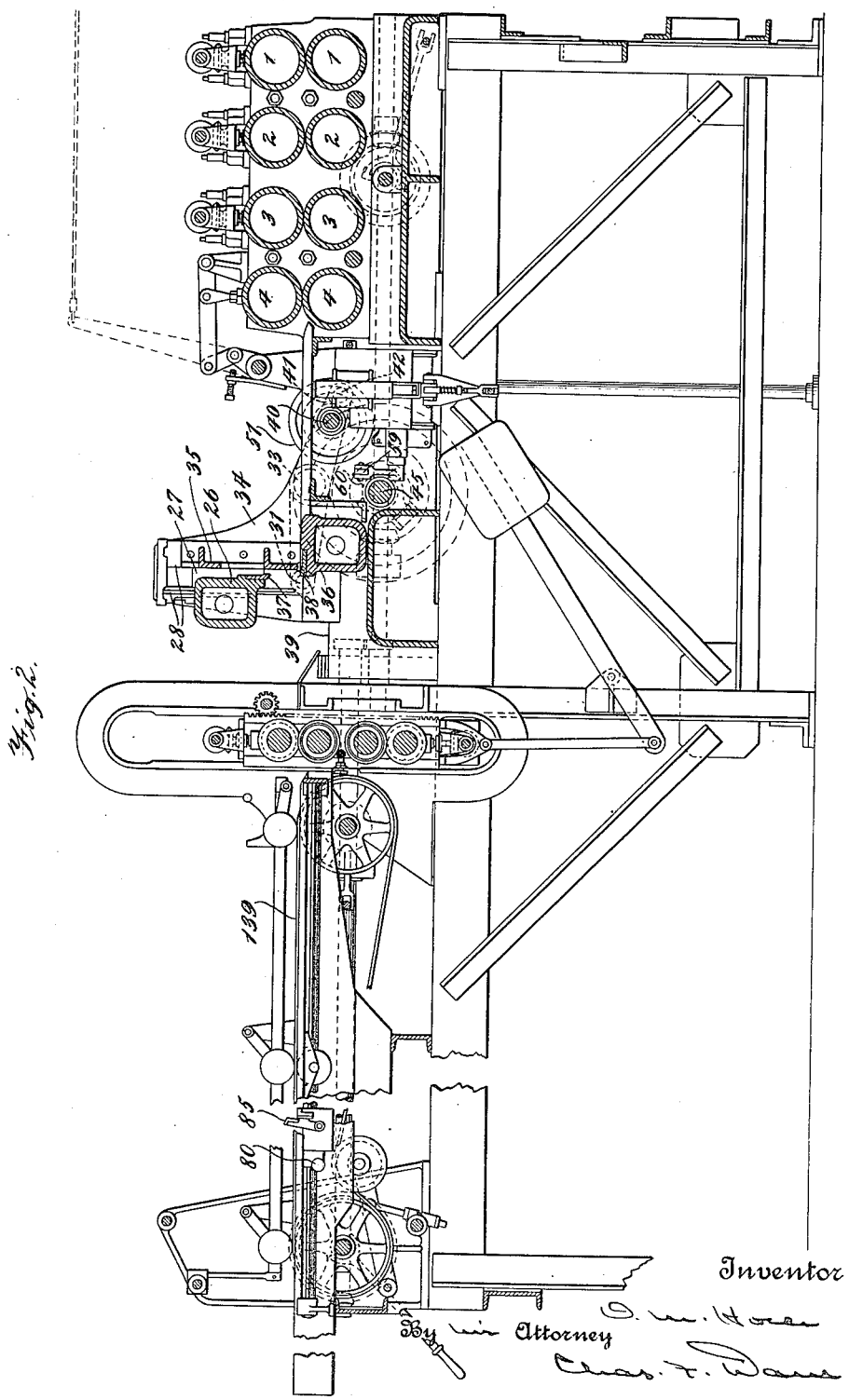

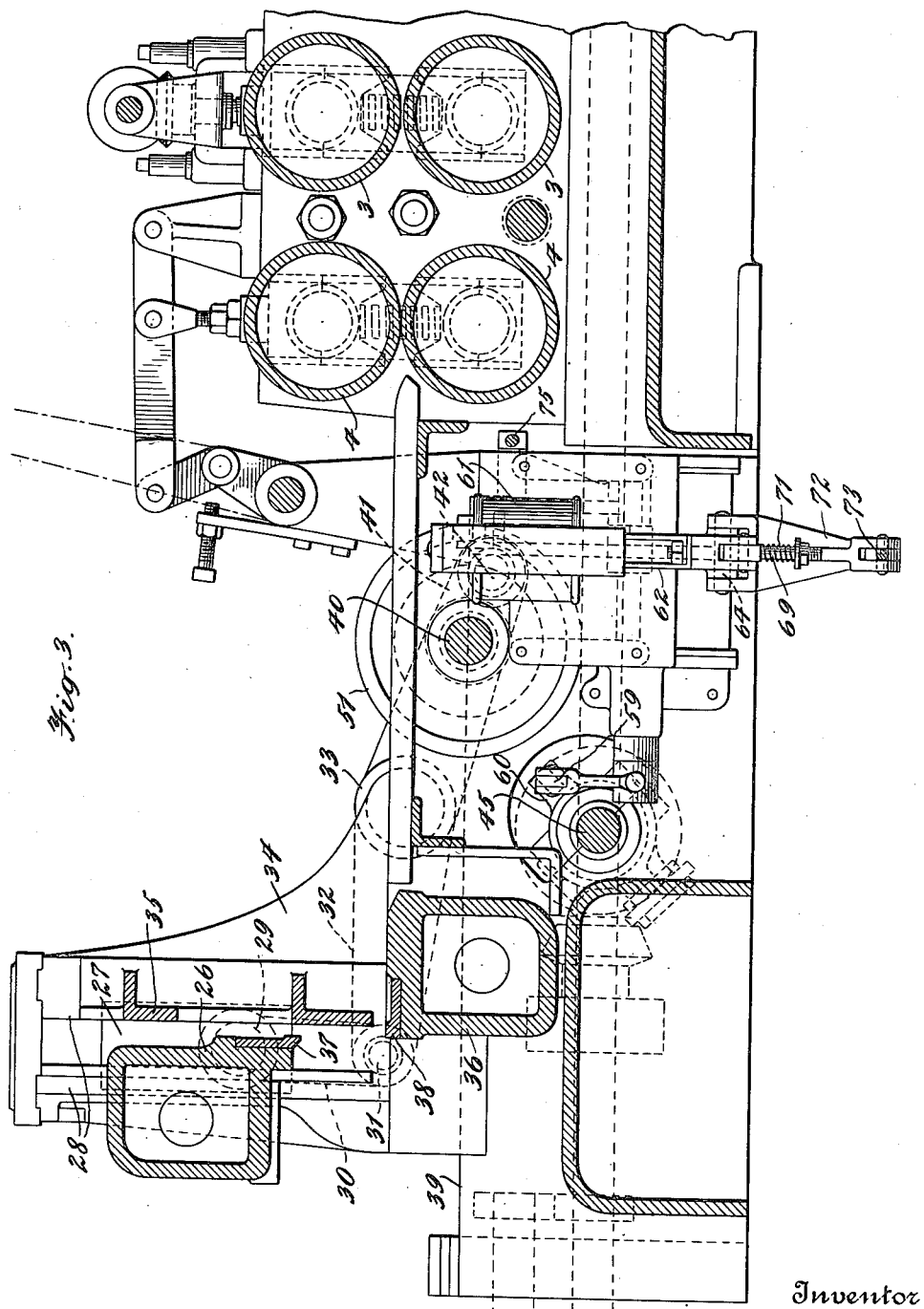

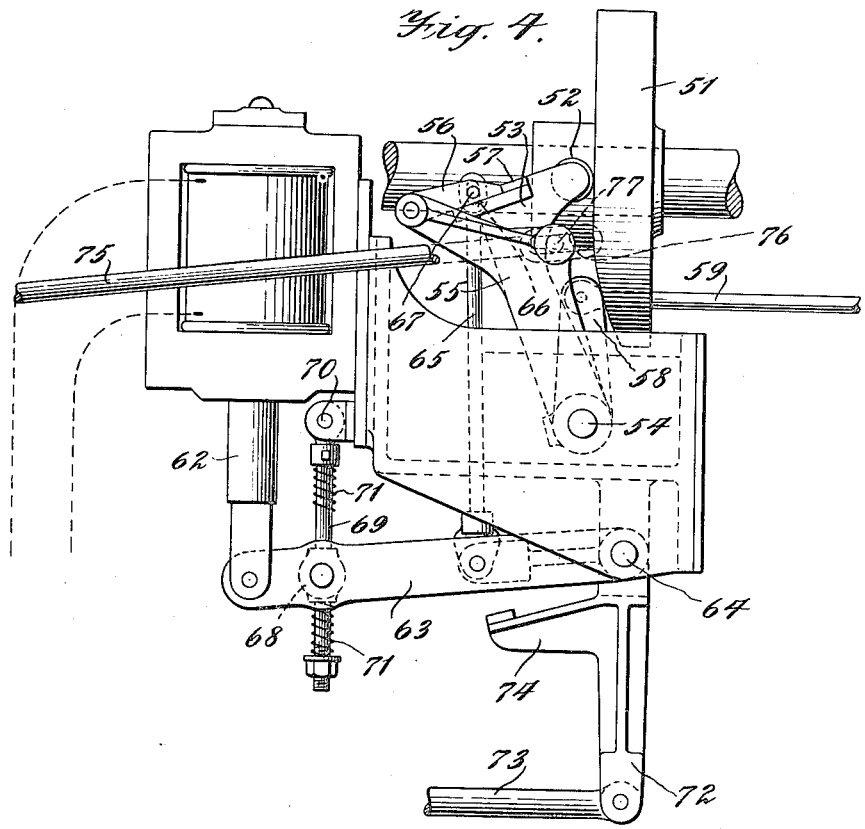

UNITED STATES PATENT OFFICE.

OTTO M. HOCH, OF ROCHESTER, NEW YORK, ASSIGNOR TO M. D. KNOWLTON COMPANY, OF ROCHESTER, NEW YORK, A CORPORATION OF NEW YORK.

SHEAR MECHANISM.

1,321,039.　　　　　　Specification of Letters Patent.　　　Patented Nov. 4, 1919.

Application filed December 20, 1915. Serial No. 67,799.

*To all whom it may concern:*

Be it known that I, OTTO M. HOCH, a citizen of the United States, and resident of Rochester, in the county of Monroe and State of New York, have invented certain new and useful Improvements in Shear Mechanism, of which the following is a specification.

This invention relates to shear mechanism for cutting webs of material and has for its object to provide an improved type of shear mechanism which is capable of cutting a web of moving material transversely without interrupting movement of the web or without necessitating stoppage of the movement of the web before the cutting operation. This is accomplished by mounting the shear blades for movement parallel with the movement of the web and providing novel actuating means for imparting movement to the shear blades during the cutting action, so that said shear blades will move with the web during the cutting action.

The actuating means is so designed that it not only produces the cutting action by properly actuating the vertically movable shear blade, but also imparts the above-mentioned movement to the shear blades so that they will move with the web during the cutting action. Furthermore, the actuating means is designed to effect the cutting action at the time the shear blades attain their maximum speed of movement with the web, which maximum speed is predetermined with respect to the speed at which the web is fed between the shear blades, so that when the cutting action takes place, the shear blades will be moving with the web at the same rate that the web is moving. After the cutting operation takes place, the shear blades are moved backwardly to their initial position and the vertically movable shear blade is returned to its normal raised position.

The shearing mechanism herein disclosed is designed especially for cutting a web of lined corrugated board transversely into blanks, but it will, of course, be obvious that the type of web operated upon is immaterial. Furthermore, the present mechanism was designed for use in combination with certain other mechanism adapted especially for feeding lined corrugated board to the shear mechanism and discharging the cut blanks from the shear mechanism. The shear mechanism is disclosed in this relation in the co-pending application of T. W. Adams, C. R. Seymour and myself, Serial No. 67,818 filed December 20, 1915. The present application is directed specifically to the shear mechanism disclosed in said co-pending application. It is obvious that the shear mechanism need not be used in the relation disclosed in the co-pending application as it is capable of use either as a unit by itself or in combination with any other parts for operating upon the web of material.

The invention is illustrated in the accompanying drawings, in which—

Figure 1 is a plan view, partly in section, of the machine disclosed in the above-mentioned co-pending application and showing the shear mechanism in combination therewith;

Fig. 2 is a longitudinal vertical section taken through the center of the machine shown in Fig. 1;

Fig. 3 is a vertical section through the shear mechanism; and

Fig. 4 is a broken detail view of the mechanism employed for setting the shear blades in operation and for preventing more than one operation thereof.

Referring to the drawings, and particularly to Figs. 1, 2 and 3, it will be noted that a lower knife bar 36 is provided, which extends transversely of the machine and is mounted at its end portions in the shear frames 34, there being one of such shear frames at each side of the machine, as shown in Fig. 1. The knife bar 36 carries the knife blade 38 with which the knife blade 37 coöperates, the latter being carried by the vertically movable knife bar 26.

The knife bar 26 also extends transversely of the machine and has its end portions 29 formed into slide blocks 27. As is best shown in Fig. 3, each slide block 27 is mounted for vertical movements in a guideway formed in the housing 28, there being one of such housings 28 at each side of the machine. The two housings 28 are interconnected and braced by a transverse girder 35.

The two shear frames 34, together with the housings 28, the interconnecting girder 35 and the two knife bars are mounted for movements as a unit longitudinally of the machine, and for this purpose, the shear frames 34 are mounted upon guides 39 formed on the bed of the machine.

Reciprocating movement is imparted to the shear frames 34, and hence to the two knife bars, by actuating means which is also capable of lowering and again raising the upper knife bar 26 during the reciprocation of the shear frames. This is accomplished by pivoting a lever 32 at each side of the machine to the corresponding shear frame 34, as shown at 33, and connecting one end 31 of each of the levers to one extremity of the upper knife bar 26 through the intermediary of the connecting links 30. The other end of each lever 32 is pivoted, as at 42, to a crank arm 41. The two crank arms 41 are carried by and rotate with a transversely-extending crank shaft 40. As will be noted from Fig. 1, the crank arms 41 are positioned at the extremities of the crank shaft. It is obvious that rotation of the crank shaft 40 will oscillate the levers 32 about their pivotal connections 33 and, hence, reciprocate the upper knife bar in a vertical direction. As the levers 32 are pivoted at 33 to the shear frames, the rotation of the crank shaft will also impart a horizontal reciprocating motion to the shear frames. It will be noted that when the crank pins 42 rotate from the position shown in Fig. 3 in an anti-clockwise direction, the shear frames, together with the upper and lower knife bars, will move to the left in Fig. 3, which, as will hereinafter appear, is the same direction in which the web of material passes between the shear blades. Approximately at the time when the shear frames attain their maximum speed and are moving at about the same speed as the web of material, the cutting action will take place. This is due to the fact that the cutting action takes place when the crank pins 42 are at approximately their highest points, and at this time also the shear frames are moving at their maximum speed. The second half of each revolution of the crank pins 42 will, of course, return the shear frames to their normal position and return the upper knife bar to its raised position.

As will be seen from Fig. 1, the crank shaft 40 is geared to an actuating shaft 45 by means of the meshing gears 50 and 49 carried by the crank shaft and the actuating shaft, respectively. The rotation of the actuating shaft 45 is controlled by a friction clutch, the two members of which are shown at 44 and 46. The cone member 46 is keyed to the actuating shaft 45, but is mounted to slide thereon while the clutch member 44 is mounted to rotate freely upon the extremity of the shaft 45. The clutch member 44 is made to assume the shape of a pulley, so that a belt passing thereover may serve to rotate the clutch member 44 and impart rotation to the shaft 45 when the clutch members are in engagement. The machine shown in the drawings, in combination with which the present shear mechanism is illustrated, is provided with a longitudinally-extending drive shaft 151, and this shaft may be utilized for rotating the clutch member 44, if desired, by providing a pinion 152 on said shaft 151 and a crown gear 153 on the clutch member 44. The pinion 152 and the crown gear 153 mesh, and, therefore, when the clutch members are in engagement, the actuating shaft 45 may be driven from the shaft 151.

The construction of the actuating means for controlling the engagement of the clutch members 44 and 46 will depend largely upon the relation in which the shear mechanism is used. In the present instance, the clutch members 44 and 46 are adapted to be engaged by a sheet trip. The crank shaft is thus set in operation and is allowed to make one complete revolution, at which time the clutch members 44 and 46 are thrown out of engagement by the means to be presently described. Before the sheet trip and this means for throwing out of engagement the clutch members 44 and 46 are described, the movement of the web through the machine should be considered. So far as the present invention is concerned, it is immaterial how the web is fed between the knife bars, but in the machine in combination with which the shear mechanism is illustrated, the web is fed forwardly between the knife bars by means of a plurality of pairs of feed rolls. The rolls of the first pair are shown at 1, those of the second pair at 2, those of the third pair at 3, and the rolls of the fourth pair at 4. The web passes between the upper and lower roll of each pair and is thus positively fed forward toward the shear mechanism. The detailed construction of the feed mechanism and the means for rotating the feed rolls form no part of the present invention and need not be herein described.

The forward edge of the web strikes a trip plate 85 carried by a sheet trip 43 that may be moved longitudinally of the machine by the thumb nut 80 to properly position the trip. The detailed construction of the sheet trip 43 need not be herein considered, it being sufficient for the present purpose to note that the actuation of the trip plate 85 by the forward edge of the web completes an electric circuit in which the electric solenoid 61 (Fig. 3) is interposed. It is the energization of this solenoid that trips the clutch mechanism 44—46 and sets the shear mechanism in operation. The location of the solenoid 61 and its relation with respect to the parts above described are apparent from Figs. 1, 2 and 3.

Mounted upon the crank shaft 40 in the vicinity of the solenoid 61 is a cam 51, the cam surface of which is formed upon one of the lateral sides of the cam. Upon this cam surface rides a cam roller 52 carried by a bracket 53 which is mounted to swing about the axis of a stub shaft 54. Mounted to swing about the axis of the same stub shaft 54 is a second bracket 55, to the extremity of which is pivoted a pawl 56 which normally engages a shoulder 57 formed on the bracket 53. It will be understood that the two brackets 53 and 55 swing about the axis of the stub shaft 54 independently of each other, but are normally held in the relative positions shown in Fig. 4 by the pawl 56. Mounted to oscillate unitarily with the bracket 55 is a rock arm 58, which is connected by means of a link 59 to a yoke 60, which, as will be noted from Fig. 1, acts directly upon the clutch member 46 to slide the same upon the actuating shaft 45 against the tension of a coil spring 47, which normally tends to force the cone 46 into engagement with the clutch member 44. The spring 47 is interposed between a collar 48 carried by the shaft 45 and a shoulder formed on the cone member 46. The engagement of the clutch members 44 and 46 by the spring 47 is normally prevented by the pawl 56 which holds the clutch member 46 in its inoperative position through the intermediary of the bracket 55, the rock arm 58, the link 59, and the clutch yoke 60. It is obvious, however, that if the pawl 56 were tripped, that is, if it were moved from engagement with the shoulder 57, the bracket 55 would be allowed to move inwardly toward the cam 51, and hence the clutch spring 47 would be permitted to engage the clutch members. It is the purpose of the solenoid 61 to effect this movement of the pawl 56. When energized by the actuation of the sheet trip 43, the solenoid attracts the core or armature 62 (Fig. 4) and serves to swing a link 63 upwardly about its pivotal connection 64. Connecting the mid-portion of the link 63 with the pawl 56 is a link 65. When the solenoid is energized, the link 65 rises until the extremity of a slot 66 formed therein engages a pin 67 carried by the pawl 56. The pawl is, therefore, lifted and the bracket 55 is permitted to swing inwardly toward the cam 51, thus permitting the clutch member 46 to engage with the clutch member 44, as above described.

The link 63 has pivoted thereto, a swivel block 68, through which passes a rod 69 pivotally supported at its upper end, as shown at 70, to a stationary part of the machine. Two coil springs 71 are associated with the rod 69, in such a manner as to yieldingly check the movements of the link 63 to avoid shock. These springs 71, therefore, act as buffer springs.

After the pawl 56 is tripped and the crank shaft 40 is set in motion by the engagement of the clutch members 44 and 46, the cam 51 secured to the crank shaft, of course, rotates and brings a low portion of the cam adjacent the roller 52. The bracket 53 is then permitted to move inwardly a sufficient distance to allow the pawl 56 to again drop behind the shoulder 57, it being understood that when the pawl 56 is first tripped and the bracket 55 moves toward the cam 51, the pawl 56 rides over the top of the shoulder 57. When the high part of the cam 51 again engages with the roller 52, the bracket 53 is swung backwardly to its original position, and as the pawl 56 now engages behind the shoulder 57, the bracket 55 is also returned to its original position. The restoration of the parts in this manner to their original position disengages the clutch members 44 and 46.

In order to prevent unintentional operation of the trip mechanism when working about the machine, a link 75 (Fig. 4) is provided having a slot 76 in its end portion in which a pin 77 carried by the bracket 55 engages. The pin 77 normally occupies such a position in the slot 76 that the link 75 does not interfere with the movements of the bracket 55. If the link 75 is moved to the left, however, in Fig. 4, the right-hand extremity of the slot 76 will engage with the pin 77 and prevent movement of the bracket 55, even if the pawl 56 is tripped. The link 75 may be so moved to the left and locked in such position by means of a hand-lever disposed at the side of the machine, or at any other point, where it may be conveniently actuated.

It may sometimes be desirable to trip the shear mechanism by hand and this may be done by providing a bracket 72 which is free to oscillate about the same axis 64, as the link 63. The bracket 72 is swung about this axis by means of a rod 73 which may run to the side of the machine, or any other point where it may be conveniently actuated. The bracket 72 carries a projecting arm 74 capable of engaging the link 63 to move the same upwardly when the rod 73 is moved to the left in Fig. 4. The link 63 may, therefore, be moved upwardly by actuating the rod 73 in the same manner that it is moved upwardly by the solenoid, and hence the clutch mechanism may be tripped by hand by actuating the rod 73.

In order to insure immediate stoppage of the crank shaft when the clutch members are thrown out of engagement, braking mechanism is provided which comprises two slidable rods 186 and 187 (Fig. 1) yieldingly urged toward the clutch member 46 by means of the coil springs 188 and 189, respectively. The coil springs 188 and 189 act upon nuts or shoulders 190 and 191, respectively, which also serve to limit the movement of the rods toward the clutch member 46. The extremities of the rods 186 and 187 have associated therewith friction surfaces 185 capable of engaging with a flange 184 formed on the clutch member 46. It will be understood that when the clutch members 44 and 46 are in engagement, the flange 184 is spaced from the friction surfaces 185, and hence out of contact therewith, but when the clutch member 46 is withdrawn, the flange 184 thereof bears against the friction surfaces 185 which yield slightly, due to the provision of the springs 186 and 187, but which insure a prompt stoppage of the clutch member 46, the actuating shaft 45, and hence the cam shaft 40.

When the clutch members are thrown out of engagement in the manner above described, the parts assume the position shown in Fig. 3, in which they are in readiness for a subsequent operation.

The knife blades 37 and 38 are so positioned as to cut the web transversely into blanks. The blanks so cut from the web may be discharged from the machine or conducted away from the shear mechanism by any appropriate mechanism. The machine herein illustrated is provided with a plurality of discharge belts shown at 139 for performing this function. In the present instance, the web before reaching the discharge belts passes through the trimming and creasing mechanism shown in Fig. 2, but as this portion of the machine constitutes no part of the present invention, the same will not be described. The discharge belts 139 are operated at such speed with respect to the speed at which the web is fed through the machine by the feed rolls 1, 2, 3 and 4, that the blanks cut from the web will be conducted away from the shear mechanism faster than the web is fed through the machine. As will be noted from Fig. 2, the sheet trip 43 is interposed at a point in the length of the discharge belts, and, therefore, the forward edge of the web will engage the trip plate 85, while the forward portion of the web lies on the discharge belts. When the forward portion of the web is cut by the shear mechanism to form a blank, the blank so cut is moved by the discharge belts over the trip plate 85, it being understood that when this plate is engaged by the forward edge of the web, it is swung backwardly and the web passes thereover. As the blank is conducted away by the discharge belts at a greater rate than the web is fed through the machine, the trip plate 85 will have time to rise to its normal position after the blank passes thereover and before the forward edge of the web reaches the sheet trip.

It will be understood that the shear mechanism may be set in operation by other means than the sheet trip and that the discharge belts and the feed rolls are only exemplary of mechanism which is capable of handling the web. As these parts have no direct bearing upon the present invention, a more detailed description thereof than has been given is unnecessary.

The operation of the improved shear mechanism will be largely obvious from the foregoing description. The web fed forwardly by the feed rolls moves through the machine until its forward edge engages the sheet trip. The electrical connection made by the actuation of the trip plate 85 energizes the solenoid, which, in turn, trips the clutch mechanism to rotate the crank shaft 40. The crank shaft 40 makes one and only one revolution during which the shear frames, together with the knife bars, move forwardly and are then returned to their original position. During the forward movement of the shear frames and when the latter are moving at about the same speed at which the web is fed through the machine, the upper knife bar coöperates with the lower knife bar to cut the web transversely, it being understood that during the forward and backward movement of the shear frames, the upper knife bar is lowered and then raised so that at the end of the complete revolution of the crank shaft 40, the shear frames and the upper knife bar assume their respective starting positions. It will now be clear that the same means for lowering the upper knife bar to cut the web, and subsequently raising said knife bar, is utilized for reciprocating the shear frames so that the knife bars will travel with the web during the cutting operation. It is, therefore, not necessary to arrest the movement of the web during the cutting action and the web will not buckle as would be the case if the shear frames did not move and the knives cut the web while the latter was in motion.

Numerous changes may be made in the details of construction as above described without departing from the spirit or scope of the invention, as defined in the accompanying claims.

What I claim is:—

1. The combination with shearing means for transversely cutting a web of moving material, of positively actuated means, controlled by the aforesaid web of material, for bodily reciprocating the shearing means.

2. The combination with shearing means for transversely cutting a web of moving material, of positively actuated means, controlled by the aforesaid web of material, for bodily reciprocating the shearing means, the movement of said shearing means in one direction being with the moving web.

3. The combination with shearing means for transversely cutting a web of moving material, of positively actuated means, controlled by the aforesaid web of material, for bodily reciprocating the shearing means, the movement of said shearing means in one direction being with the moving web and at a rate corresponding to the rate at which the web is moving.

4. The combination with two coöperating knife blades, for shearing a web of moving material, of positively actuated means, controlled by the aforesaid web of material, for actuating one of said blades, said means being also adapted to bodily reciprocate the knife blades.

5. The combination with two coöperating elements for operating upon a web of moving material, of positively actuated means, controlled by the aforesaid web of material, for actuating said elements to perform the desired operation, said means being also adapted to impart a bodily reciprocatory movement to the elements longitudinally of the web.

6. The combination with two coöperating elements for operating upon a web of moving material, of positively actuated means, controlled by the aforesaid web of material, for bodily reciproating said elements in a direction parallel to the direction of movement of the web.

7. The combination with two relatively movable cutting blades adapted to cut a web of moving material, of positively actuated means, controlled by the aforesaid web of material, for imparting reciprocating movement to said blades in a direction parallel to the direction of movement of the web.

8. Shear mechanism for cutting a web of moving material comprising a frame slidable in a direction parallel to the direction of movement of the web, relatively movable cutting blades mounted in said frame, and positively actuated means, controlled by the aforesaid web of material, for moving said cutting blades relatively to each other and for reciprocating said frame to and from operative position.

9. Shear mechanism for cutting a web of moving material comprising a frame slidable in a direction parallel to the direction of movement of the web, relatively movable cutting blades mounted in said frame, a crank shaft, and connections whereby the rotation of said crank shaft reciprocates said frame and moves the cutting blades relative to each other to cut the web, said connections being under the control of the web of material being operated upon.

10. The combination with a vertically movable knife blade and a relatively stationary knife blade, of positively actuated means, under the control of the work, to reciprocate both of the blades in a direction at right angles to the cut made by the blades, said means being adapted to impart vertical movement to said vertically movable knife.

11. The combination with two relatively movable knife blades for cutting a web of moving material, of a crank shaft, means whereby the rotation of said crank shaft moves said blades relative to each other and also positively reciprocates the same in a direction parallel to the direction of movement of the web, means for setting said crank shaft in operation, and means for arresting the motion of the blades in a direction parallel to the direction of movement of the web and in a direction to and away from each other.

12. Shear mechanism for cutting a web of moving material comprising a vertically movable knife blade, a relatively stationary blade, a rotatable crank shaft, connections whereby one rotation of said crank shaft lowers and subsequently raises the vertically movable knife blade and also imparts a complete positive reciprocation to both knife blades, means for setting said crank shaft in operation, and means for arresting the reciprocating motion of the pair of blades and the independent motion of the vertically movable blade.

Signed at Rochester, in the county of Monroe, and State of New York, this 7th day of December, A. D. 1915.

OTTO M. HOCH.

Witnesses:
Thos. D. Patton,
Geo. S. Goodell.